United States Patent
Tonkin et al.

(10) Patent No.: US 6,453,610 B2
(45) Date of Patent: *Sep. 24, 2002

(54) METHOD FOR MODIFYING ROOT GROWTH

(75) Inventors: Mark Christopher Tonkin, Ripe Lane (GB); Mark Andrew Young, Hemel Hempstead (GB); Olaf Norbert Kirchner, Wilmington, DE (US); Charles William Cahill, Newark, DE (US)

(73) Assignees: E. I. du Pont de Nemours and Company, Wilmington, DE (US); Design Technology & Innovation, East Sussex (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,798

(22) Filed: Aug. 6, 1999

(51) Int. Cl.[7] .................................................. A01G 9/02
(52) U.S. Cl. ........................................ 47/66.7; 47/58.1
(58) Field of Search ............................... 47/48.5, 65.5, 47/65.7, 66.7, 79, 80, 75, 59, 58.1

(56) References Cited

U.S. PATENT DOCUMENTS

| | | | | |
|---|---|---|---|---|
| 2,814,161 A | * | 11/1957 | Hawkins | |
| 3,534,497 A | * | 10/1970 | Hornbostel | |
| 4,034,506 A | | 7/1977 | Kasahara et al. | |
| 4,096,663 A | * | 6/1978 | Silver | 47/80 |
| 4,098,021 A | * | 7/1978 | Gruber | 47/78 |
| 4,216,623 A | * | 8/1980 | Silver | 47/80 |
| 4,661,254 A | | 4/1987 | Zupancic et al. | |
| 4,698,372 A | | 10/1987 | Moss | |
| 4,908,984 A | * | 3/1990 | Lenke | 47/58 |
| 4,926,585 A | | 5/1990 | Dreschel | |
| 4,939,865 A | * | 7/1990 | Whitcomb et al. | 47/77 |
| 5,664,369 A | | 9/1997 | Kertz | |
| 6,173,531 B1 | * | 1/2001 | Howell | 47/73 |

FOREIGN PATENT DOCUMENTS

| | | |
|---|---|---|
| EP | 268 556 A1 | 5/1988 |
| EP | 791 620 A2 | 8/1997 |
| GB | 2 265 536 A | 10/1993 |
| SU | 1648291 A1 | 12/1988 |
| WO | WO 95/24260 A1 | 9/1995 |

OTHER PUBLICATIONS

Japan Patent Abstract, JP 11–189726 A, Mitsui Petrochem Ind. Co. Ltd. , "High Oxygen and Moisture–Permeable Resin Composition For Films", Jul. 13, 1999.

* cited by examiner

Primary Examiner—Peter M. Poon
Assistant Examiner—Judith A. Nelson

(57) ABSTRACT

A method of modifying the growth of plant roots is provided in which the roots are grown in proximity to a membrane from which water is released during the growth of the roots, wherein the membrane is a hydrophobic porous membrane or a hydrophilic non-porous membrane. The method may also be used to collect materials exuded from plant roots by growing the plant roots in a growing medium that is surrounded by a membrane so that moisture is released into the growing medium from the membrane while materials exuded from the plant roots are retained within the growing medium by the membrane, wherein the membrane is a hydrophobic porous membrane or a hydrophilic non-porous membrane.

8 Claims, 2 Drawing Sheets

METHOD FOR MODIFYING ROOT GROWTH

FIELD OF THE INVENTION

This invention relates generally to methods of modifying the growth of plant roots and specifically to methods of improving the harvestability or accessibility of plant roots by growth in proximity to a hydrophilic non-porous membrane or a hydrophobic porous membrane.

BACKGROUND OF THE INVENTION

Much time and effort has been invested in modifying the growth of many plant species in order to increase ease of harvesting of, or access to, commercially valuable products (fruit, seeds, flowers, leaves, etc) but less effort has been made, and even less success achieved, with respect to the modification of plant root growth. In fact, the structure of a plant's roots can be of great commercial interest; for example, because the roots themselves are a commercial product (or source thereof) or because their structure will greatly affect the ease of harvesting a plant or the ease and chances of success at uprooting and replanting the plant.

Examples of commercially valuable roots include bulk agricultural crops such as carrots or beetroot, etc and also roots grown for their pharmaceutical or homeopathic properties. The processing required after extraction of commercially valuable roots will vary greatly depending upon their intended use; for example, simple removal of most adhered growing medium for carrots; or intensive cleaning, chopping, heat treatment and chemical extraction for pharmaceutically valuable roots. In all cases, however, the ease of removing as much of the root system from the ground as possible and then separating the root system from the growth medium is important, both in terms of volume of root recovery and in post extraction processing costs.

When plants are being grown in bulk before replanting, for example seedlings in a nursery, it is again important to be able to remove as high a proportion as possible of the developing root system from the growth medium without damage, so that the replanted plant will have the best chance of regrowth whilst avoiding diseases caused by microbial attack on broken roots.

A further category of roots that are commercially valuable are those that release commercially valuable materials into the growing medium; for example, it is now known that most plant root systems release specific materials (e.g., antimicrobial materials, growth regulating materials including natural herbicides, etc) although often in very small amounts. Means of improving the growth of such root systems and particularly means of improving the collection of such exuded materials would be of great benefit.

Numerous materials that allow the passage of water whilst restricting the passage of suspended or even dissolved materials are known. One recently identified group of materials are hydrophilic polymers. Membranes of these materials are known to be impervious to liquid water but to allow the passage of water vapor (a process known as pervaporation). If there is a vapor pressure across a hydrophilic membrane, water will be absorbed in the form of vapor from the side with higher vapor pressure, and transported across the membrane and released as water vapor on the side with lower vapor pressure; the released water vapor may be used directly or condensed back to liquid water. However, in either case, it may be pure (both chemically and microbiologically) as any contaminants will be retained either on the other side of the membrane or (in some cases) in the membrane itself.

Hydrophobic porous membranes will also selectively allow the passage of water whilst retaining dissolved or suspended matter.

SUMMARY OF THE INVENTION

It has now been found that if plant roots are grown in proximity to certain membranes (i.e. hydrophilic non-porous or hydrophobic porous membranes) from which water is released the structure of the roots will be modified so that they are easier to harvest and/or to separate from the growth medium following harvesting. It has also been found that plant roots grown in proximity to such membranes from which water is released will tolerate growth in more confined volumes than is usual and will therefore be less likely to become pot bound.

There is therefore provided a method of modifying the growth of plant roots by growing the roots in proximity to a membrane from which water is released during the growth of the roots, wherein the membrane is a hydrophobic porous membrane or a hydrophilic non-porous membrane.

There is also provided a method of collecting materials exuded from plant roots by growing the plant roots in a growing medium that is surrounded by a membrane such that moisture is released into the growing medium from the membrane whilst materials exuded from the plant roots are retained within the growing medium by the membrane, wherein the membrane is a hydrophobic porous membrane or a hydrophilic non-porous membrane.

DETAILED DESCRIPTION OF THE INVENTION

Figure 1:
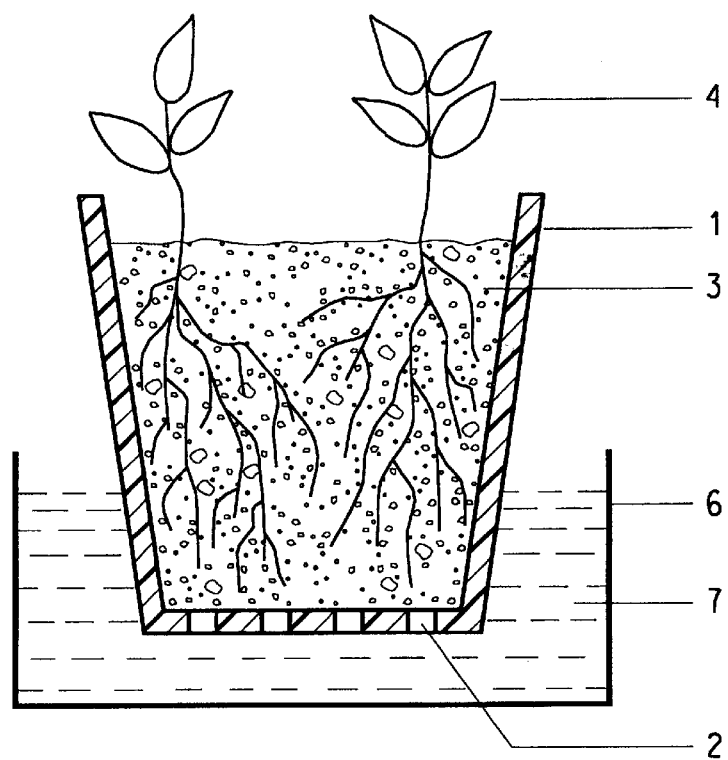
FIGS. 1 and 4 are diagrammatic representations of methods of growing plants that do not result in root modification (for comparative purposes).

By root growth modification it is meant that the size, shape, morphology and distribution of the roots is affected, such that they grow substantially only in close proximity to the selected membrane that serves as the major or sole source of water to the plant, rather than by randomly spreading out to fill a large volume within the growing medium as occurs when plants are irrigated conventionally. Root modification may therefore be achieved by the use of a membrane which is the principal source of water for the roots, whilst at the same time retaining undesired impurities (if present) in the water source and preventing these from entering the growing medium surrounding the plant.

Roots produced by the claimed method will often have a tissue-like appearance. Roots whose growth has been modified in the manner according to the present invention therefore form more easily visible (and therefore collectable) structures that follow the shape of the membrane that provides most or all of the irrigation water to the plant. By growing in this manner, it is also made easier to dig up the root systems without damage thereto, as the space occupied by the root systems is reduced. For example, if the membrane used for irrigation beneath the soil surface is presented to the roots in the form of a flat sheet or a tube, the form of the roots grown in this manner may be described as like a dense flat or cylindrical mat, respectively.

Plants that may be used in the practice of the present invention include any variety for which root growth modification may be advantageous. Examples of such advantages include:

(1) The ability to increase the biomass of the roots, compared to the biomass of the plant above ground, in the case of plants from which roots are harvested;
(2) The ability to control the shape of roots, so that more uniform commercial crops may be obtained;
(3) The ability to control the manner in which a plant is anchored in the soil;
(4) The ability to target the direction of root growth, which in turn offers benefits including
  (a) the ability to most efficiently utilize nutrients, minerals, agricultural chemicals and the like that are present in specific layers of the growing medium, or which may be supplied to specific zones of the growing medium,
  (b) the ability to avoid polluted or otherwise undesirable regions of the growing medium,
  (c) conversely to (b) above, the ability to remediate polluted or otherwise undesirable regions of the growing medium by establishing plant roots in polluted or otherwise undesirable regions of the growing medium so that said undesirable materials are incorporated into the plant, and subsequently disposing of these undesirable materials with the plant,
  (d) the ability to prevent weed growth, and
  (e) the ability to avoid the root system of neighboring plants;
(5) Easier uprooting and replanting, e.g. of seedlings grown in a nursery, because the roots do not adhere to or penetrate into the irrigation system, and because the roots can be caused to grow in specific areas reducing entanglement between the roots of neighboring plants, and
(6) The ability to improve root harvesting and processing by reducing the amount of growing medium that needs to be cleaned off the roots.
(7) The ability to grow plants in an environment of controlled moisture such that harmful pathogens may be excluded from the harvested product, as said harmful pathogens may develop if the root zones of the plants are too humid.

In carrying out the present invention it is preferred that the developing plant is supported in a growth medium in which the plant roots may grow; preferred growth media include any conventional material in which plants are normally grown, e.g. naturally occurring, artificial or artificially amended soils; sand (optionally containing added plant nutrients); commercially available growth medium such as is used in "Growbags", or vermiculite; peat moss; shredded tree fern bark; chipped or shredded tree bark or shredded coconut husks.

Membranes suitable for use in the present invention include hydrophobic porous membranes and hydrophilic non-porous membranes.

For the purposes of this disclosure, "hydrophobic porous membrane" means a membrane made from any material in the form of fibers, film and the like, which features pores of size less than 1 micron (also known as micropores), through which liquid may not pass, but through which pores water vapor may diffuse from the side with higher vapor pressure to the side with lower vapor pressure.

Suitable hydrophobic porous membranes include woven or non-woven fabrics or films made from polyethylene, polypropylene, polytetrafluoroethylene and the like.

Suitable hydrophilic non-porous membranes for use in the present invention are non-porous hydrophilic membranes that absorb water and allow water to pass through only by pervaporation. If there is a vapor pressure gradient across the hydrophilic membrane, this absorbed water diffuses through the thickness of the membrane and is emitted from its opposite face. Hydrophilic non-porous membranes or coatings feature sufficiently high water vapor transmission rates as defined below, so that water that has passed through these membranes can be used directly in irrigating plants. Such membranes can comprise one or more layers made from materials including but not limited to the same or different hydrophilic polymers. As long as the water vapor permeation rate of the membrane in total is sufficiently high, this water can be provided at a rate consistent with its use in a given practical application as described. The non-porous nature of the membranes serves to exclude any particulate impurities from passing through such a membrane, including microbes such as bacteria and viruses, and also prevents penetration by the growing roots.

The rate at which water pervaporates through the hydrophilic non-porous membrane made from the hydrophilic polymer depends, among other factors, upon the moisture content on the non-water side. Therefore, irrigation systems of the present invention are self-regulating and may be "passive" in nature, providing more water to plants under dry conditions and less under humid conditions.

The standard test for measuring the rate at which a given membrane transmits water is ASTM E-96-95—Procedure BW, previously known and named as ASTM E-96-66—Procedure BW, which is used to determine the Water Vapor Transmission Rate (WVTR) of a membrane.

A preferred membrane for the purposes of the method of root modification of the present invention comprises one or more layers of hydrophilic non-porous membranes.

"Hydrophilic polymers" means polymers which absorb water when in contact with liquid water at room temperature according to the International Standards Organization specification ISO 62 (equivalent to the American Society for Testing and Materials specification ASTM D 570).

The hydrophilic polymer suitable for preparing the hydrophilic non-porous membranes for use in the present invention can be one or a blend of several polymers, for example, the hydrophilic polymer can be a copolyetherester elastomer or a mixture of two or more copolyetherester elastomers as described below, such as polymers available from E I du Pont de Nemours and Company under the trade name Hytrel®; or a polyether-block-polyamide or a mixture of two or more polyether-block-polyamides, such as polymers available from the Elf-Atochem Company of Paris, France under the trade name of PEBAX; or a polyether urethane or a mixture of polyether urethanes; or homopolymers or copolymers of polyvinyl alcohol or a mixture of homopolymers or copolymers of polyvinyl alcohol.

A particularly preferred polymer for water vapor transmission in this invention is a copolyetherester elastomer or mixture of two or more copolyetherester elastomers having a multiplicity of recurring long-chain ester units and short-chain ester units joined head-to-tail through ester linkages, where the long-chain ester units are represented by the formula:

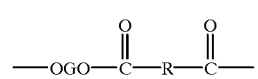

(I)

and said short-chain ester units are represented by the formula:

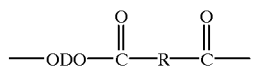

wherein:
a) G is a divalent radical remaining after the removal of terminal hydroxyl groups from a poly(alkylene oxide) glycol having a number average molecular weight of about 400–4000;
b) R is a divalent radical remaining after removal of carboxyl groups from a dicarboxylic acid having a molecular weight less than 300;
c) D is a divalent radical remaining after removal of hydroxyl groups from a diol having a molecular weight less than about 250; optionally
d) the copolyetherester contains 0–68 weight percent based on the total weight of the copolyetherester, ethylene oxide groups incorporated in the long-chain ester units of the copolyetherester; and
e) the copolyetherester contains about 25–80 weight percent short-chain ester units.

This preferred polymer is suitable for fabricating into thin but strong membranes, films and coatings. The preferred polymer, copolyetherester elastomer and methods of making it are known in the art, such as are disclosed in U.S. Pat. No. 4,725,481 for a copolyetherester elastomer with a WVTR of at least 3500 g/m$^2$/24 hr, or U.S. Pat. No. 4,769,273 for a copolyetherester elastomer with a WVTR of 400–2500 g/m$^2$/24hr. Both are hereby incorporated by reference.

The polymer can be compounded with antioxidant stabilizers, ultraviolet stabilizers, hydrolysis stabilizers, dyes or pigments, fillers, anti-microbial reagents and the like.

The use of commercially available hydrophilic polymers as membranes is possible in the context of the present invention, although it is more preferable to use copolyetherester elastomers having a WVTR of more than 400 g/m$^2$/24 hr measured on a film of thickness 25 microns using air at 23° C. and 50% relative humidity at a velocity of 3 m/s. Most preferred is the use of membranes made from commercially available copolyetherester elastomers having a WVTR of more than 3500 g/m$^2$/24 hr, measured on a film of thickness 25 microns using air at 23° C. and 50% relative humidity at a velocity of 3 m/s.

The hydrophilic polymers can be manufactured into membranes of any desired thickness by a number of processes. A useful and well-established way to make membranes in the form of films is by melt extrusion of the polymer on a commercial extrusion line. Briefly, this entails heating the polymer to a temperature above the melting point, extruding it through a flat or annular die and then casting a film using a roller system or blowing a film from the melt.

Membranes for use in the present invention may include one or more layers of support materials. Useful support materials include woven, non-woven or bonded papers, fabrics and screens permeable to water vapor, including those constructed from fibers of organic and inorganic polymers stable to moisture such as polyethylene, polypropylene, fiberglass and the like. The support material both increases strength and protects the membrane. The support material may be disposed on one side of the membrane or both sides or may be sandwiched between two or more layers. When disposed on only one side, the support materials can be in contact with the source of water or away from it. Typically the support material is disposed on any surface of the membrane exposed to the environment to best protect the membrane from physical damage and/or degradation by light.

In carrying out the method of modifying the growth of plant roots of the present invention, it is necessary that water be released from a first face of the membrane to which the roots are proximal so that it can be taken up by the root system. This release of water may be continuous or episodic depending upon the water requirements of the plant being grown and the nature of the growth medium, if present. In order for water to be released, it is therefore necessary for the second face of the membrane to be in communication with a water source. This water source may be a bulk supply of liquid water or may be a material in which water is carried, e.g. damp soil, etc. For the present invention, particularly when the selected membrane is a hydrophilic non-porous membrane, the quality of the water in contact with the second face of the membrane is not important as passage through the membrane will mean that only water of suitable quality is provided to the roots.

It is preferred in carrying out the method of modifying the growth of plant roots of the invention that the membrane is the principal source of water during growth of the roots. More preferably, the membrane is substantially the only source of water during the growth of the roots. Furthermore, it is preferred that if a growth medium is present, the growth medium does not itself retain substantial moisture (e.g., because of its physical properties or because it is well drained or sufficiently well ventilated to cause it to dry out) such that the developing roots obtain substantially all of their moisture directly from the membrane and not from moisture retained in the growth medium.

The method of modifying the growth of plant roots of the present invention may be carried out, for example, by forming a container constructed at least partially from a suitable membrane and containing water, which is then placed in an area of ground that is not waterlogged and does not frequently receive water from any other source (e.g. rain, irrigation systems, surrounding moist soil) and then planting in that ground at least one seed or young plant such that the roots as they grow will come into proximity with at least a part of the container composed of a suitable membrane from which water is released. The ground used may be an area of natural ground (field, garden, etc) in an area that does not receive frequent water from any other source (e.g. because the area is covered, the ground is very dry or porous or there is little rain); or it may be an artificial growth area such as a "Growbag" or a trough containing non-liquid growth medium, which does not receive moisture from any other source.

Alternatively, the method of modifying the growth of plant roots of the present invention may be carried out by enclosing a developing root system, and optionally the supporting growth medium, in an impervious material, at least a part of which comprises a suitable membrane, such that water can substantially only each the roots by passing through the membrane. In this embodiment, the material surrounding the plant roots may be composed entirely of a suitable membrane or the suitable membrane may form a substantial proportion of the material. As discussed previously, it is necessary for at least a part of the membrane not facing the root system to be in communication with a supply of water. One means of carrying out this embodiment of the invention is to dig a hole in an area of ground and to line the hole with a suitable membrane. The hole may then be filled-in (either using the previously excavated material or replacing it with a suitable growth medium) and at least one seed or young seedling planted in the filled-in hole. Water may then be supplied to the membrane by natural seepage (if the area of ground is normally moist) or by the artificial application of water to the ground, outside the area bounded by the membrane. This water will then pass through the membrane into the growth medium and to the roots. Alternatively, a rigid structure (e.g. a porous plant pot or a non-porous plant pot having holes therein) may be lined with a membrane and then filled with a growth medium into which is planted at least one seed or a young seedling. The structure is then placed directly into water, or into a moist medium that will provide water, so that water passes through the rigid structure, through the membrane and into the growth medium, where it is taken up by the roots of the plant as they grow. Alternatively, the rigid structure may itself be composed, at least partially, of a membrane so that the need for a separate membrane is removed.

In the above embodiments of the method of modifying the growth of plant roots of the present invention, the size and shape of the holes and/or rigid containers is not relevant except that they must be proportioned such that the roots of the plants will be in proximity to the suitable membrane during their development. Similarly, with respect to the size of the membrane, it is merely necessary that it have a sufficient surface area to provide sufficient water for the developing root systems. The preferred thickness of the membrane will depend upon the materials used in its preparation and the required rate of water transfer; however, preferred thicknesses are generally between 10 microns and 500 microns, for example 25 microns.

By enclosing developing roots closely in a suitable membrane according to the method of the present invention, the shape of the roots may be closely controlled which may be of advantage (optimization or standardization of size, shape, etc) if the roots are themselves a commercial product (e.g. radishes or carrots).

A further means of carrying out the method of modifying the growth of plant roots of the present invention is to spread one or more seeds directly on to a first face of a suitable membrane. The reverse face of the membrane is then placed in contact with a water source (for example by allowing the membrane to float on a water surface) and the seeds are allowed to germinate so that the roots grow in close proximity to the membrane. Optionally, growth medium may be provided (initially or after germination) to support the plants as they grow.

By growing roots in proximity to a suitable membrane, it is meant that a large proportion of the roots, once grown, are in direct contact with, or are very close to, the membrane. Preferably at least 25% by weight of the grown roots are in contact with, or are within 10 mm of, the membrane; more preferably at least 50% by weight of the grown roots are in contact with, or within 10 mm of, the membrane and most preferably at least 75% by weight of the grown roots are in contact with, or within 10 mm of, the membrane.

It is a feature of the present invention that roots will grow to be very close to, or in contact with, the suitable membranes but they will not penetrate the membranes, so that the roots can be removed from the membranes without significant damage.

Types of plant which may benefit from the method of root modification of the present invention include:

(a) bulk commercial food crops, including but not limited to peanuts, carrots, potatoes, beetroot, parsnips, radishes and the like;

(b) crops with roots grown for flavors and spices, including but not limited to ginger, turmeric, horseradish, licorice and the like;

(c) crops with roots harvested for the extraction of dyes, including but not limited to turmeric, indigo and the like;

(d) crops with roots harvested for the extraction of pharmaceutical or homeopathic qualities, including but not limited to burdock, comfrey, gentian, ginseng, ipecacuanha, valerian and the like (see Table 1) and (e) crops with roots that produce, by exudation into the soil, useful substances that may be used to control the growth of other plants or to prevent the establishment of weeds and the like. These substances, known as allelopathic chemicals or allelochemicals, are produced by plants including but not limited to rye, rice, sorghum, mustard plants, manzanita shrubs, black walnut trees or spurge (see Table 2).

TABLE 1

A SELECTION OF MEDICINAL ROOTS AND THEIR USES

| Plant | Latin name | Function of root extracts | Important constituents of root extracts |
| --- | --- | --- | --- |
| Burdock | Arctium lappa | Diuretic, bitter | Flavonoid glycosides, bitter glycosides, alkaloids |
| Comfrey | Symphytum officinale | Demulcent | Allontoin, tannin, various alkaloids |
| Dandelion | Taraxacum officinale | Hepatic | Glycosides, triterpenoids, choline |
| Gentian | Gentiana lutea | Bitter | Gentiopicrin, amarogentine, pectin, tannin |
| Ginger | Zingiber officinale | Carminative | Zingiberene, zingiberole, phellandrene, borneol, cineole, citral |
| Ginseng | Panax ginseng | Adaptogen | Steroidal glycosides (panaxosides), sterols, D-Group vitamins |
| Golden Seal | Hydrastic canadensis | Cholagogue | Alkaloids hydrastine, berberine and canadine |
| Horseradish | Armoracia rusticana | Rubefacient | Mustard oil glycosides, sinigrin |
| Ipecacuanha | Cephelis ipecacuanha | Emetic | Alkaloids emetine and cephaleine, ipecoside, glycosidal tannins, ipecacuanhic acid and ipecacuanhin |
| Lesser celandine, pilewort | Ranunculus ficaria | Astringent | Anemonin, proto-anemonin, tannin |
| Valerian | Valeriana officinalis | Sedative | Valerianic acid, isovalerianic acid, borneol, pinene, camphene, volatile aklaloids |
| Wild indigo | Baptisia tinctoria | Anti-microbial | Alkaloids, glycosides, oleoresins |
| Wild yam | Dioscera villosa | Anti-inflammatory | Steroidal saponins including dioscene, phytosterois, alkaloids, tannin |
| Yellow dock | Rumex crispus | Aperient | Anthraquinone glycosides, tannins |

TABLE 2

A SELECTION OF PLANTS PRODUCING ALLELOPATHIC CHEMICALS

| Plant | Name of allelopathic compound from roots | Class of allelopathic compound |
| --- | --- | --- |
| Rice | Numerous | Aromatic hydroxyacids |
| Rye | BOA and DIBOA | Aromatic heterocyclic ketones |
| Sorghum | Dhurrin | Cyanogenic glucoside |
| Mustard | Allylisothiocyanate | Thiocyanate |

TABLE 2-continued

A SELECTION OF PLANTS PRODUCING ALLELOPATHIC CHEMICALS

| Plant | Name of allelopathic compound from roots | Class of allelopathic compound |
|---|---|---|
| Salvia shrub | Camphor | Monoterpene |
| Guayule | Cinnamic acid | Aromatic acid |
| Manzanita shrub | Arbutin | Phenolic compound |
| Psoralea | Psoralen | Furanocoumarin |
| Black walnut | Juglone | Quinone |
| Apple | Phlorizin | Flavonoid |
| Spurge | Gallic acid | Tannin |

To carry out the method of collecting materials exuded from plant roots of the present invention, it is necessary to surround the roots with a barrier material to create a zone around the roots from which none of the exuded materials are lost; at least a part of the surrounding material being a suitable membrane that is in communication with a water source to provide water to the roots but which does not permit egress of the exuded materials. In this method the roots are preferably surrounded by a natural or artificial growing medium which is most preferably a liquid, e.g. a hydroponic growth medium or water. Exuded materials may be collected from the zone surrounding the roots by removing the growing medium and subjecting this to appropriate chemical recovery techniques, depending upon the nature of the exuded materials (e.g., protein recovery methods, chromatography, etc). Plants suitable for use in this method include all those releasing useful materials (e.g. allelopathic compounds) from their roots during growth, for example those plants listed in Table 2 above.

EXAMPLE 1

Five non-porous plant pots 1 made from plastic, of height 8 cm and diameter 8 cm, having 8 holes 2 bored in the bases were filled with potting soil 3 and two radish seeds were planted therein as shown diagrammatically in FIG. 1. All pots were watered regularly with tap water.

Figure 2:
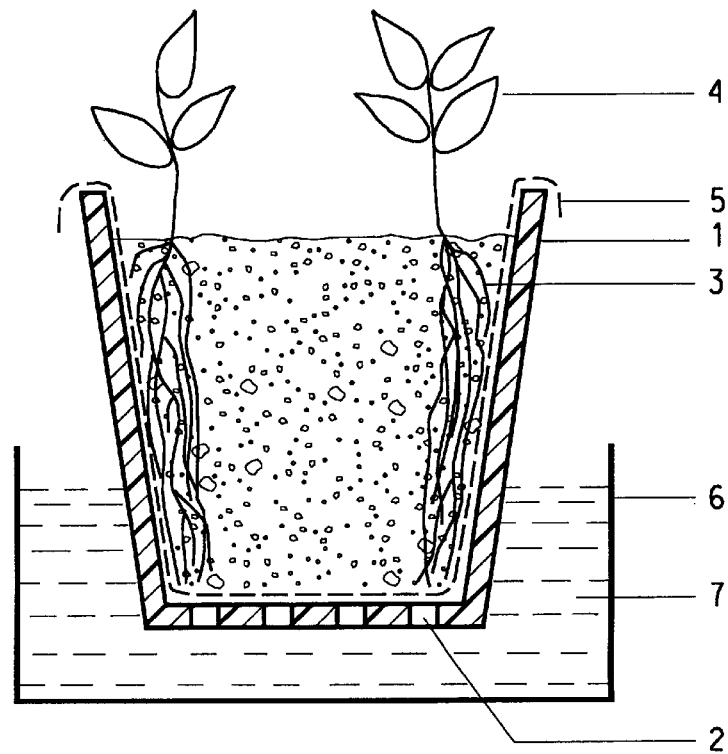
FIGS. 2 and 3 are diagrammatic representations of methods of modifying the growth of plant roots of the present invention.

After two weeks, all plants had germinated and each pot contained two radish seedlings 4. One pot was selected at random and the pot was carefully removed from the root ball and soil. A non-porous hydrophilic membrane 5 of 50 microns thickness, made from an extruded film of polyetherester elastomer, was used to wrap the root ball and soil and the assembly was then replaced in the plant pot 1, so that the soil 3 was completely surrounded by this membrane pot liner 5. The pot was then placed in a larger plastic container 6 such that this container 6 surrounded the plant pot 1. Tap water 7 was poured into the gap between the surrounding container 6 and the plant pot 1, so that the hydrophilic membrane 5 prevented liquid water from reaching the soil 3, as shown diagrammatically in FIG. 2. The water level in the surrounding container was kept topped up such that the water level reached to just below the soil level in the plant pot, but no further water was added directly to the soil. The other four plant pots 1 containing radish seedlings 4 were watered conventionally, i.e. by pouring water into the soil 3 at intervals suitable for the radish plants to grow normally. All five plants were kept at ambient temperature and humidity and monitored daily.

After around a further four weeks, all five radish plants had grown well and no differences were discernible between the plants grown in the lined and unlined pots.

The growing medium containing the plants was then carefully removed from each pot so that the state of the roots could be examined and it was found that there were major differences between the lined and unlined pots.

In the unlined pots the growth medium was very moist and the roots of the plants had developed in a conventional manner so that the whole of the growth medium was penetrated by a tangled mass of hair-like roots. Separation of these roots from the growth medium was very difficult and most of the fine roots were damaged or completely detached from the plants.

In the lined pots the growth medium was much drier and the roots had developed in a markedly different manner, so that they were immediately visible as sheet-like structures growing in close proximity to, and in direct contact with, the hydrophilic membrane. Very few roots penetrated into the body of the growing medium and the roots were thus very easy to separate from the growing medium with very little damage. A far higher proportion of the roots were collectable from the growing medium without the intensive sieving and separating required in the case of the unlined pots.

EXAMPLE 2

A total of 12 plant pots 31, made from terracotta or plastic, of length 60 cm, width 15 cm and height 15 cm, were fitted with acrylic windows 32 along one long side, allowing roots to be viewed as the plants grown in them developed. Terracotta plant pots allowed moisture to diffuse through the plant pot walls most rapidly, thus simulating the effect of a larger volume of soil around the growing plants, whereas plastic pots retained soil moisture more and so provided a more favorable growing environment. The soil 33 used in these plant pots was Sassafras sandy loam, with 1% of N-P-K fertilizer added in pellet form and of moisture content between 10% and 15%. The pots were prepared and corn (maize), sorghum and alfalfa seedlings were planted, as described below. These three plants were used because they feature widely different water uptake efficiencies—sorghum being the most efficient (i.e., using the least amount of water to grow a unit of biomass) and alfalfa being the least efficient, with the water use efficiency of corn in between the two. All pots were placed in a greenhouse over the summer months. Measured maximum air temperatures in the greenhouse were typically in excess of 30° C.

Figure 3:
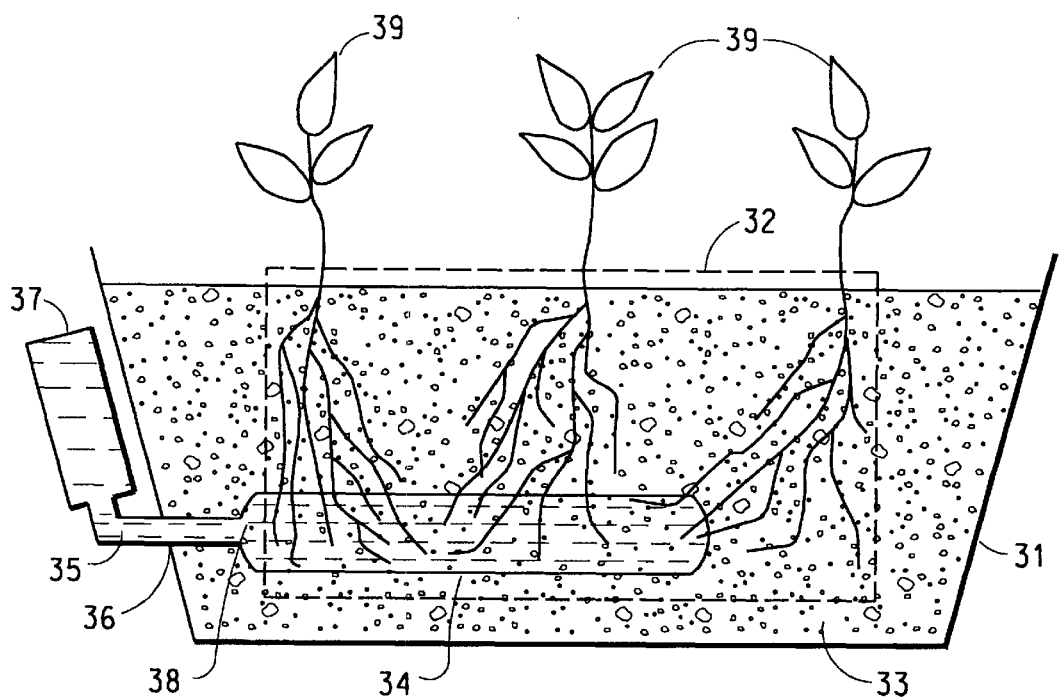

In each of the Experiments, 1, 2, 5, 6, 9 and 10, around 1 cm depth of soil was placed in the bottom of the plant pot. Then, a sealed cylindrical membrane bag 34 of length around 30 cm and of surface area around 265 cm$^2$, made from a sheet of polyetherester elastomer of thickness around 50 microns, was placed so that it was resting horizontally on the soil layer. Each cylindrical membrane bag was equipped with a length of plastic hose 35, which was taken outside the pot through a small hole 36 drilled in its side, and connected with a watertight seal to a water bottle 37. The plant pot was then filled with soil, so that the membrane bag was buried to a depth of around 10 cm below soil level. The bags were replenished daily with deionized water, in a way that the only source of water 38 in the soil in the pots was through the wall of the membrane bags. Three plant seedlings 39 were grown, positioned at the ends and in the middle of each plant pot as shown in FIG. 3.

Figure 4:
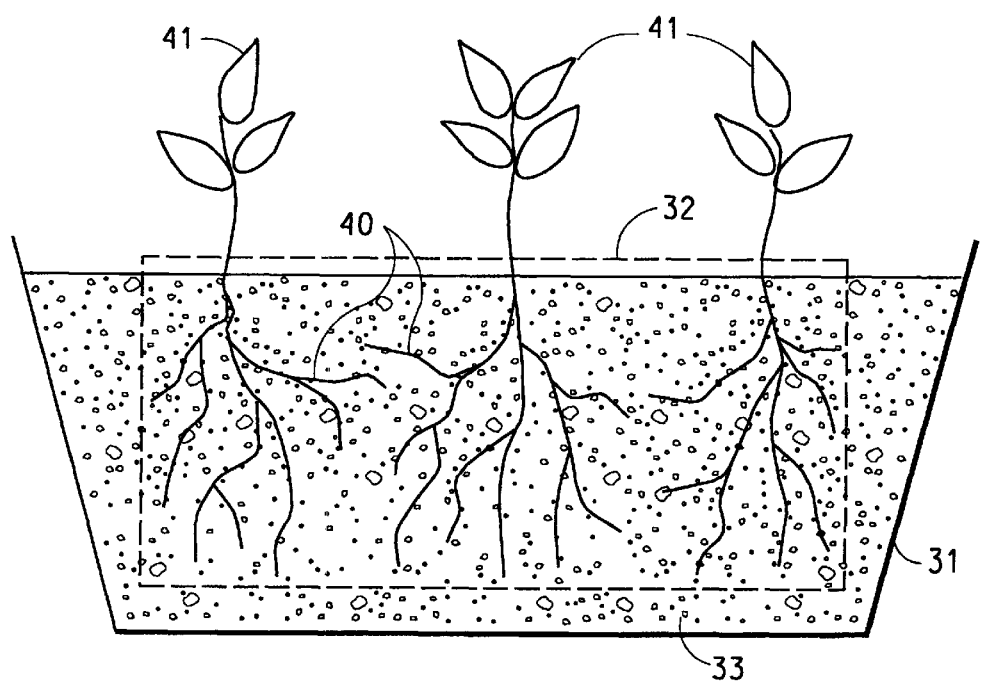

Each of the pots in Experiments 3, 4, 7, 8, 11 and 12 was filled with soil, and three plant seedlings 41 were grown, positioned at the ends and in the middle of the plant pots as shown in FIG. 4. The plants were irrigated conventionally with deionized water from above.

The pattern of root growth of the twelve experiments was observed over time. Results are given in Table 3. The results show clearly that roots in the plant pots irrigated through a hydrophilic membrane bag grew principally around the surface of this bag, independent of the nature of the plant and of the pot used. The shape of the roots in these Experiments 1, 2, 5, 6, 9 and 10 was of a matted structure, with some coarse and some fine roots following the surface of the bag but without penetrating the material of the bag.

In contrast, the roots 40 of plants irrigated conventionally grew in a way that explored all regions of the soil for the uptake of water and nutrients.

TABLE 3

Selected Experiments to Evaluate Root Morphology (Example 2)

| Experiment No | Plant | Pot Type | Irrigation Method | Observed Root Growth Pattern |
|---|---|---|---|---|
| 1 | alfalfa | terracotta | through membrane bag | matted sheet, mainly around surface of membrane bag |
| 2 | alfalfa | plastic | through membrane bag | matted sheet, mainly around surface of membrane bag |
| 3 | alfalfa | terracotta | direct | entire volume of soil explored |
| 4 | alfalfa | plastic | direct | entire volume of soil explored |
| 5 | corn | terracotta | through membrane bag | matted sheet, mainly around surface of membrane bag |
| 6 | corn | plastic | through membrane bag | matted sheet, mainly around surface of membrane bag |
| 7 | corn | terracotta | direct | entire volume of soil explored |
| 8 | corn | plastic | direct | entire volume of soil explored |
| 9 | sorghum | terracotta | through membrane bag | matted sheet, mainly around surface of membrane bag |
| 10 | sorghum | plastic | through membrane bag | matted sheet, mainly around surface of membrane bag |
| 11 | sorghum | terracotta | direct | entire volume of soil explored |
| 12 | sorghum | plastic | direct | entire volume of soil explored |

What is claimed is:

1. A method for modifying growth of a plant root, comprising the step of:
   growing a plant root in a growth medium in proximity to a nonporous hydrophilic membrane which provides water to the growth medium.

2. The method of claim 1, wherein the membrane is the principal source providing water to the growth medium.

3. The method of claim 1, wherein the membrane is substantially the only source providing water to the growth medium.

4. A method for modifying growth of a plant root, comprising the step of:
   growing a plant root in a growth medium in proximity to a nonporous hydrophilic membrane which provides water to the growth medium,
   wherein after said growing step at least 25% by weight of the plant root is in contact with, or is within 10 mm of, the membrane.

5. The method of claim 4, wherein after said growing step at least 50% by weight of the plant root is in contact with, or is within 10 mm of, the membrane.

6. The method of claim 5, wherein after said growing step at least 75% by weight of the plant root is in contact with, or is within 10 mm of, the membrane.

7. A method for modifying growth of a plant root, comprising the step of:
   growing a plant root in a growth medium in proximity to a nonporous hydrophilic membrane comprising copolyetherester elastomer which provides water to the growth medium.

8. The method of claim 7, wherein the nonporous hydrophilic membrane comprises one or more colyetherester elastomers having a multiplicity of recurring long-chain ester units and short-chain ester units joined head-to-tail through ester linkages said long-chain ester units being represented by the formula:

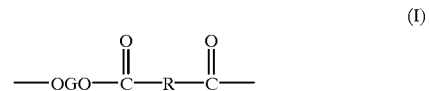

(I)

and the short-chain ester units being represented by the formula:

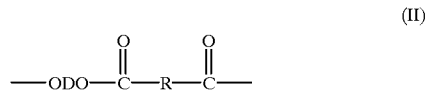

(II)

wherein:

G is a divalent radical remaining after the removal of terminal hydroxyl groups from a poly(alkylene oxide) glycol having a number average molecular weight of about 400–4000;

R is a divalent radical remaining after removal of carboxyl groups from a dicarboxylic acid having a molecular weight less than 300;

D is a divalent radical remaining after removal of hydroxyl groups from a diol having a molecular weight less than about 250;

the copolyetherester contains 0–68 weight percent, based on the total weight of the copolyetherester, ethylene oxide groups incorporated in the long-chain ester units of the copolyetherester; and the copolyetherester contains about 25–80 weight percent short-chain ester units.

* * * * *